United States Patent
Zhu et al.

(10) Patent No.: US 12,552,983 B2
(45) Date of Patent: Feb. 17, 2026

(54) TRACER COMPOSITIONS

(71) Applicant: Saudi Arabian Oil Company, Dhahran (SA)

(72) Inventors: Shitong Sherry Zhu, Waban, MA (US); Ayrat Gizzatov, Winchester, MA (US); Nermeen Saadoun, Somerville, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/416,286

(22) Filed: Jan. 18, 2024

(65) Prior Publication Data

US 2025/0236788 A1    Jul. 24, 2025

(51) Int. Cl.
| | |
|---|---|
| C09K 8/84 | (2006.01) |
| C09K 8/88 | (2006.01) |
| C09K 11/06 | (2006.01) |
| E21B 47/11 | (2012.01) |
| E21B 49/08 | (2006.01) |
| G01N 33/24 | (2006.01) |

(52) U.S. Cl.
CPC .............. *C09K 8/885* (2013.01); *C09K 8/845* (2013.01); *C09K 11/06* (2013.01); *E21B 47/11* (2020.05); *C09K 2211/1088* (2013.01)

(58) Field of Classification Search
CPC .......... G01N 33/24; E21B 47/11; E21B 49/08
See application file for complete search history.

(56) References Cited

U.S. PATENT DOCUMENTS

| | | | |
|---|---|---|---|
| 9,260,957 B2 | 2/2016 | Commarieu et al. | |
| 11,796,517 B2 * | 10/2023 | Wang | E21B 47/11 |
| 2005/0109087 A1 | 5/2005 | Robb | |
| 2008/0093073 A1 | 4/2008 | Bustos | |
| 2008/0210421 A1 | 9/2008 | Wilson | |
| 2009/0107673 A1 | 4/2009 | Huang | |
| 2011/0024115 A1 | 2/2011 | Brice et al. | |
| 2011/0253366 A1 | 10/2011 | Berrigan et al. | |
| 2013/0126158 A1 | 5/2013 | Gupta et al. | |
| 2014/0374106 A1 | 12/2014 | Zhu et al. | |
| 2016/0115377 A1 | 4/2016 | Abivin et al. | |
| 2018/0128096 A1 * | 5/2018 | Cox | E21B 49/00 |

(Continued)

FOREIGN PATENT DOCUMENTS

EP    3786415 A1    3/2021

OTHER PUBLICATIONS

Khmelnitskiy et al., "Fluorescent Based Tracers for Oil and Gas Downhole Applications: Between Conventional and Innovative Approaches," Eng. Proc., May 2022, 19(1):12, 6 pages.

(Continued)

*Primary Examiner* — Zakiya W Bates
(74) *Attorney, Agent, or Firm* — Fish & Richardson P.C.

(57) ABSTRACT

A method for tracing gas flow in a hydrocarbon reservoir with compositions including a degradable polymer and a detectable component. An exemplary method includes introducing a tracer composition at a first location in the reservoir, contacting the tracer composition with the reservoir to hydrolyze the degradable polymer, and detecting a degraded tracer composition including the hydrolyzed polymer and the detectable component in a gas sample collected at a second location in the reservoir.

25 Claims, 4 Drawing Sheets

(56) References Cited

U.S. PATENT DOCUMENTS

| | | |
|---|---|---|
| 2018/0155597 A1 | 6/2018 | Burns |
| 2018/0306027 A1* | 10/2018 | Sherman ................. E21B 29/00 |
| 2020/0024506 A1 | 1/2020 | Trudel et al. |
| 2020/0063015 A1 | 2/2020 | Lieng |
| 2021/0301651 A1 | 9/2021 | Tippit |
| 2021/0380864 A1 | 12/2021 | Ghebremeskel et al. |
| 2023/0144199 A1 | 5/2023 | Wang et al. |
| 2023/0174839 A1 | 6/2023 | Solovyeva et al. |
| 2024/0209729 A1 | 6/2024 | Gizzatov et al. |

OTHER PUBLICATIONS

International Search Report and Written Opinion in International Appln. No. PCT/US2025/012388, mailed on Apr. 22, 2025, 13 pages.

International Search Report and Written Opinion in International Appln. No. PCT/US2025/012381, mailed on May 13, 2025, 13 pages.

Davidson et al., "The reaction of phloroglucinol in the presence of acid with lignin-containing materials," Journal of Photochemistry and Photobiology A: Chemistry, Oct. 1995, 91:87-93, 7 pages.

International Search Report and Written Opinion in International Appln. No. PCT/US2025/012124, mailed on May 20, 2025, 17 pages.

\* cited by examiner

TRACER COMPOSITIONS

TECHNICAL FIELD

The present disclosure relates to tracing gas flow in a hydrocarbon reservoir with compositions including a degradable polymer and a detectable component.

BACKGROUND

Tracing technology can be used in hydrocarbon reservoirs for mapping, monitoring, and confirming in-place hydrocarbons, as well as monitoring hydrocarbon production from zones of interest. For example, tracer technology can be used to generate one or more parameters useful in reservoir characterization, including, for example, well to well connectivity, fluid allocation, fracture locations, swept volumes and residual oil saturations.

However, simultaneous surveillance of gas production from a hydrocarbon reservoir can be challenging, particularly after acidizing or fracturing. Conventional tools for monitoring such production can be expensive and, in some cases, indistinguishable due to signal overlap with other chemicals present in the reservoir. Similarly, the use of production logging tools (PLT) can be costly, and involve interruption of regular operations.

Therefore, there is a need for improved tracing of gas flow in hydrocarbon reservoirs.

SUMMARY

Provided in the present disclosure is a method of tracing gas flow in a hydrocarbon reservoir. The method includes introducing a tracer composition at a first location in the reservoir, the tracer composition including a degradable polymer and a detectable component, and contacting the tracer composition with the reservoir to hydrolyze the degradable polymer. The method further includes detecting a degraded tracer composition in a gas sample collected at a second location in the reservoir, the degraded tracer composition including the hydrolyzed polymer and the detectable component. The detectable component includes a fluorescent dye, and a metal oxide.

Also provided in the present disclosure is a stimulation fluid including an aqueous medium and a tracer composition, the tracer composition being suspended in the aqueous medium. The tracer composition includes a degradable polymer and a detectable component, and the detectable component includes a fluorescent dye and a metal oxide.

DETAILED DESCRIPTION

Figure 1:
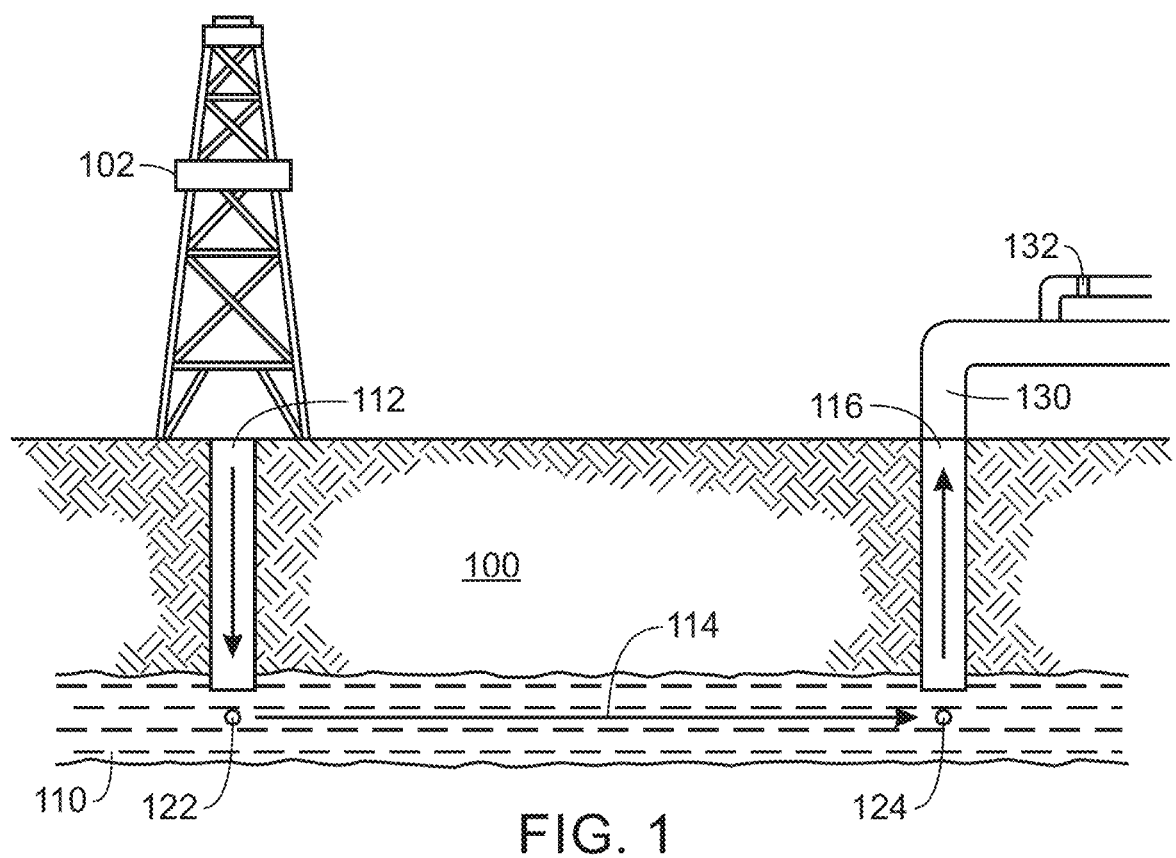
FIG. 1 is a schematic illustration of a subterranean formation including a hydrocarbon reservoir.

The present disclosure relates to methods for tracing gas flow in a hydrocarbon reservoir with tracer compositions including a degradable polymer and a detectable component. Upon introduction at a first site of the reservoir, for example, at a stimulation site of the reservoir, hydrolysis of the degradable polymer can yield a degraded tracer composition that can be carried by gas flow though the reservoir. The degraded tracer composition can be detected at a second location in the reservoir, for example, at a producing site of the reservoir. Gas flow patterns of the reservoir can be determined by comparing the detectable component of the degraded tracer composition collected at the second location with that of the tracer compositions introduced at the first location. The tracer compositions of the present disclosure can be cost effective, and can have unique, customizable detection profiles suitable, for example, for introduction to multiple stimulation stages of a hydrocarbon reservoir for gas flow analysis of the entire reservoir.

Tracer Compositions

The present disclosure relates to methods for tracing gas flow in a hydrocarbon reservoir by introducing a tracer composition into the reservoir. The tracer compositions include a degradable polymer and a detectable component.

In some embodiments, the degradable polymer is hydrolysable under the conditions of the hydrocarbon reservoir. For example, the degradable polymers of the present disclosure can become brittle and break down upon exposure to the elevated humidity, temperature, and pressure of the reservoir.

In some embodiments, the degradable polymer includes a thermoplastic. In some embodiments, the thermoplastic includes a thermoplastic polyester. For example, in certain such embodiments, the thermoplastic includes a poly(lactic acid) (PLA), polyethylene terephthalate (PET), polypropylene terephthalate (PBT), polybutylene terephthalate (PBT).

In some embodiments, the degradable polymer includes a thermoplastic polyester elastomer. In some embodiments, the thermoplastic polyester elastomer includes a block copolymer including a hard segment and a soft segment. In certain such embodiments, hydrolysis of the thermoplastic polyester elastomer causes the soft segment to break down, decreasing the viscoelasticity of the tracer composition. Such brittle compositions can degrade into smaller particles under applied pressure, such as that in a hydrocarbon reservoir, which can then be carried by gas flow though the reservoir.

In some embodiments, the hard segment includes a polyester including an alkylene diol monomer unit and an aromatic dicarboxylic acid monomer unit. In some embodiments, the alkylene diol monomer unit includes ethylene glycol, propylene diol, butylene diol, or any combination thereof. In some embodiments, the aromatic dicarboxylic acid monomer unit includes terephthalic acid, 2,6-naphthalenedicarboxylic acid, 4,4'-biphenyldicarboxylic acid, or any combination thereof. For example, in certain such embodiments, the hard segment includes ethylene terephthalate, propylene terephthalate, butylene terephthalate, or any combination thereof. In some embodiments, the soft segment includes a polyether, a polyester, a polycarbonate, or any combination thereof. In some embodiments, the soft segment includes a polyether, for example, including a polyoxyalkylene glycol. For example, in certain such embodiments, the polyoxyalkylene glycol includes polytetramethylene glycol. In some embodiments, the soft segment includes a polyester, for example, including polycaprolactone or polybutylene adipate.

In some embodiments, the thermoplastic polyester elastomer includes a poly(butylene terephthalate)-co-(tetramethylene ether) glycol terephthalate (PBT-PTMG). In some embodiments, the thermoplastic polyester elastomer includes a poly(ethylene terephthalate)-co-(tetramethylene ether) glycol terephthalate (PET-PTMG). Exemplary thermoplastic polyester elastomers include HYTREL® thermoplastic polyester elastomers, such as HYTREL® 7246.

In some embodiments, a weight-average molecular weight of the degradable polymer is about 20,000 g/mol to about 500,000 g/mol, for example, about 20,000 g/mol to about 300,000 g/mol, about 20,000 g/mol to about 250,000 g/mol, about 20,000 g/mol to about 150,000 g/mol, about 50,000 g/mol to about 500,000 g/mol, about 50,000 g/mol to about 300,000 g/mol, about 50,000 g/mol to about 250,000 g/mol, about 50,000 g/mol to about 150,000 g/mol, about 100,000 g/mol to about 500,000 g/mol, about 100,000 g/mol to about 300,000 g/mol, about 100,000 g/mol to about 250,000 g/mol, or about 100,000 g/mol to about 150,000 g/mol.

In some embodiments, the detectable component includes a colorant. In certain such embodiments, the colorant is detectable in the visible spectrum. In some embodiments, the colorant includes a pigment, for example, a green pigment, a red pigment, or a yellow pigment. Exemplary colorants include OMNICOLOR™ multipurpose color concentrates, such as OMNICOLOR™ Fluorescent Green, OMNICOLOR™ Flame Red, and OMNICOLOR™ Fluorescent Yellow. In some embodiments, the tracer composition includes about 0.01 wt % to about 20 wt % of the colorant, and about 80 wt % to about 99.99 wt % of the degradable polymer, or about 0.01 wt % to about 10 wt % of the colorant, and about 90 wt % to about 99.99 wt % of the degradable polymer. In some embodiments, the tracer composition includes about 0.01 wt % to about 0.5 wt %, about 0.01 wt % to about 0.3 wt %, about 0.025 wt % to about 1 wt %, about 0.025 wt % to about 0.5 wt %, about 0.025 wt % to about 0.3 wt %, about 0.05 wt % to about 1 wt %, about 0.05 wt % to about 0.5 wt %, or about 0.05 wt % to about 0.3 wt % of the colorant. In some embodiments, the tracer composition includes about 95 wt % to about 99.5 wt %, about 95 wt % to about 99 wt %, about 98 wt % to about 99.99 wt %, about 98 wt % to about 99.5 wt %, about 98 wt % to about 99 wt %, about 99 wt % to about 99.99 wt %, about 99 wt % to about 99.5 wt %, or about 99 wt % to about 99 wt % of the degradable polymer.

In some embodiments, the detectable component includes a fluorescent dye and a metal oxide. In certain such embodiments, the fluorescent dye is detectable in the visible spectrum. Exemplary fluorescent dyes include xanthene dyes, cyanine dyes, and coumarin dyes. In some embodiments, the fluorescent dye includes a xanthene dye such as fluorescein, rhodamine, eosin, or Texas red. In certain such embodiments, the fluorescent dye includes a rhodamine dye, such as rhodamine B.

In some embodiments, the metal oxide includes a metal oxide hydroxide, or a metal hydroxide. In some embodiments, the metal oxide includes an aluminum oxide. In some embodiments, the aluminum oxide includes an aluminum oxide hydroxide, an aluminum hydroxide, or both. In some embodiments, the aluminum oxide includes $AlO_x(OH)_{2y}$, where the sum of x and y is up to about 2, for example, about 1 to about 2, or about 1.5. In some embodiments, the aluminum oxide includes $Al_2O_3$, $AlO(OH)$, $Al(OH)_3$, or any combination thereof. For example, in some embodiments, the aluminum oxide includes $Al(OH)_3$.

In some embodiments, the metal oxide is in the form of particles. For example, in some embodiments, the detectable component includes a particulate aluminum oxide, such as a particulate aluminum hydroxide. In some embodiments, an average particle size of the particulate metal oxide is about 10 nm to about 10 μm, for example, about 10 nm to about 5 μm, about 10 nm to about 1 μm, about 100 nm to about 10 μm, about 100 nm to about 5 μm, about 100 nm to about 1 μm, about 500 nm to about 10 μm, about 500 nm to about 5 μm, or about 500 nm to about 1 μm.

In some embodiments, the fluorescent dye is disposed on a surface of the particulate metal oxide. For example, in some embodiments, the detectable component includes a fluorescent dye disposed on a surface a particulate aluminum oxide, such as a particulate aluminum hydroxide. In certain such embodiments, the fluorescent dye and the particulate metal oxide are covalently bonded. For example, in some embodiments, the detectable component includes a fluorescent dye covalently bonded to the surface of a particulate aluminum hydroxide. In some embodiments, the detectable component includes rhodamine B covalently bonded to particulate aluminum hydroxide, formed, for example, by dehydration reaction of rhodamine B with an —OH group present on the surface of the particulate aluminum hydroxide.

In some embodiments, the tracer composition includes about 0.001 wt % to about 0.1 wt % of the fluorescent dye, about 1 wt % to about 80 wt % of the metal oxide, and about 10 wt % to about 99 wt % of the degradable polymer. In some embodiments, the tracer composition includes about 0.001 wt % to about 0.05 wt %, about 0.001 wt % to about 0.03 wt %, about 0.0025 wt % to about 0.1 wt %, about 0.0025 wt % to about 0.05 wt %, about 0.0025 wt % to about 0.03 wt %, about 0.005 wt % to about 0.1 wt %, about 0.005 wt % to about 0.05 wt %, or about 0.005 wt % to about 0.03 wt % of the fluorescent dye. In some embodiments, the tracer composition includes about 1 wt % to about 60 wt %, about 1 wt % to about 40 wt %, about 10 wt % to about 80 wt %, about 10 wt % to about 60 wt %, about 10 wt % to about 40 wt %, about 20 wt % to about 80 wt %, about 20 wt % to about 60 wt %, or about 20 wt % to about 40 wt % of the metal oxide. In some embodiments, the tracer composition includes about 10 wt % to about 99 wt %, about 10 wt % to about 90 wt %, about 10 wt % to about 80 wt %, about 40 wt % to about 99 wt %, about 40 wt % to about 90 wt %, about 40 wt % to about 80 wt %, about 60 wt % to about 99 wt %, about 60 wt % to about 90 wt %, or about 60 wt % to about 80 wt % of the degradable polymer.

In some embodiments, the tracer composition includes an extrudate of the degradable polymer and the detectable component. In some embodiments, the tracer composition is in the form of particles, such as pellets or fibers. In some embodiments, the tracer composition includes particles having an average size of at least about 5 mm, for example, at least about 7.5 mm, at least about 10 mm, at least about 15 mm, at least about 20 mm, at least about 30 mm, at least about 40 mm, or at least about 50 mm. In some embodiments, the tracer composition is in the form of fibers having an average length of at least about 4 mm, for example, at least about 6 mm, or at least about 10 mm. In certain such embodiments, the fibers have an average diameter of about 0.01 mm to about 1 mm, for example, about 0.01 mm to about 0.3 mm, about 0.05 mm to about 0.5 mm, or about 0.1 mm to about 1 mm.

Stimulation Fluids

Also provided in the present disclosure is a stimulation fluid including an aqueous medium, and a tracer composition suspended in the aqueous medium. In some embodiments, the simulation fluid includes a tracer composition of the present disclosure. The stimulation fluid can include other components known in the art. For example, in some embodiments, the stimulation fluid further includes a scale inhibitor, an emulsifier, a friction reducer, a weight agent, or any combination thereof.

In some embodiments, the aqueous medium includes fresh water, field water, salt water, brine, seawater, or any combination thereof. In certain such embodiments, the aqueous medium includes produced water.

In some embodiments, the stimulation fluid includes an acid. In some embodiments, the acid includes hydrofluoric acid, hydrochloric acid, or both. For example, in some embodiments, the stimulation fluid includes hydrochloric acid. In another example, in some embodiments, the stimulation fluid includes hydrochloric acid and hydrofluoric acid.

Tracing Methods

Also provided in the present disclosure are methods for tracing gas flow in a hydrocarbon reservoir. The method includes introducing a tracer composition at a first location in the reservoir, contacting the tracer composition with the reservoir to hydrolyze the degradable polymer, to yield a degraded tracer composition including the hydrolyzed polymer and the detectable component. The method includes detecting the degraded tracer composition in a gas sample collected at a second location in the reservoir.

FIG. 1 is a schematic illustration of a subterranean formation including a hydrocarbon reservoir 110. In the illustrated embodiment, a drilling system 102 is configured to introduce a tracer composition 122 at a first location 112 of the hydrocarbon reservoir 110. Hydrolysis of the degradable polymer of the tracer composition 122 yields a degraded tracer composition 124, which is carried, by gas flow 114, to a second location 116 of the hydrocarbon reservoir 110. The degraded tracer composition 124 is captured from a gas sample flowing through pipeline 130, on a filter 132.

In some embodiments, the method includes introducing any tracer composition of the present disclosure at the first location in the reservoir. In some embodiments, the method includes introducing the tracer composition to an acidized reservoir. In some embodiments, the method includes introducing the tracer composition to a fractured reservoir.

In some embodiments, the method includes pumping a stimulation fluid including the tracer composition into the reservoir at the first location. The stimulation fluid can be any stimulation described herein, for example, a stimulation fluid suitable for acidizing or fracturing operations.

The degraded tracer composition can include particles having an average size of less than the average particle size of the tracer composition introduced at the first location. For example, in some embodiments, the degraded tracer composition includes particles having an average size of less than about 2 mm, for example, less than about 1.5 mm, less than about 1.0 mm, less than about 0.5 mm, less than about 0.25 mm, less than about 0.1 mm, less than about 75 µm, less than about 50 µm, less than about 25 µm, less than about 10 µm, less than about 5 µm, or less than about 1 µm. In some embodiments, the degraded tracer composition includes particles having an average size of at least about 500 nm. In some embodiments, the degraded tracer composition includes a powder.

In some embodiments, the detectable component includes a colorant, and detecting the degraded tracer composition includes visualizing the colorant. In some embodiments, the detectable component includes a fluorescent dye, and detecting the degraded composition includes detecting the fluorescent dye with a fluorometer. In some embodiments, the detectable component includes a metal oxide, and detecting the degraded composition includes detecting the metal oxide with an X-ray fluorescence spectrometer.

Figure 2:
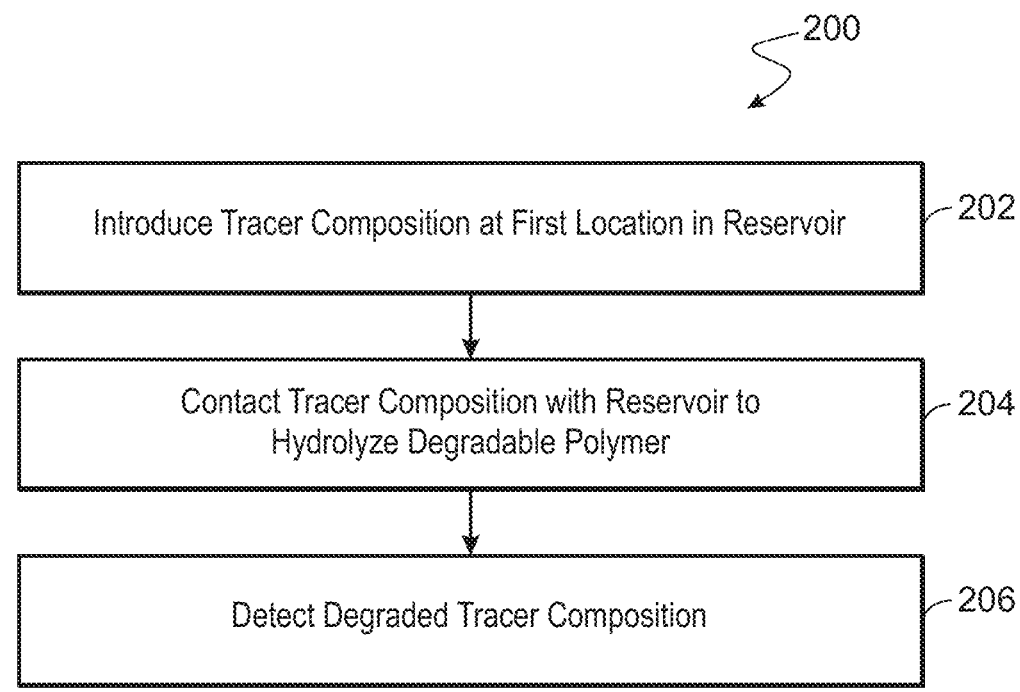
FIG. 2 is a block flow diagram of a method for tracing gas flow in a hydrocarbon reservoir.

FIG. 2 is a process flow diagram of a method 200 for tracing gas flow in a hydrocarbon reservoir. The method starts at block 202 with the introduction of a tracer composition including a degradable polymer and a detectable component at a first location in the reservoir. At block 204 of the method, the tracer composition is contacted with the reservoir to hydrolyze the degradable polymer. At block 206 of the method, a degraded tracer composition including the hydrolyzed polymer and the detectable component is detected at a second location in the reservoir.

Definitions

The terms "a," "an," and "the" are used in the present disclosure to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in the present disclosure, the term "about" can allow for a degree of variability in a value or range, for example, within 10%, within 5%, or within 1% of a stated value or of a stated limit of a range.

In the methods of the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in this disclosure, the term "size," used in reference to a particle, refers to a major dimension of the particle. For example, the size of a cylindrical particle is the greater of its diameter and its height. In another example, the size of a spherical particle is its diameter.

As used in the present disclosure, the term "metal oxide" refers to stoichiometric and non-stoichiometric metal oxides, metal oxide hydroxides, and metal hydroxides. Exemplary metal oxides include silicon oxides and aluminum oxides.

As used in the present disclosure, the term "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Injecting a material in a subterranean formation can include contacting the material with any section of a wellbore or with any subterranean region in fluid contact therewith. Subterranean materials can include any materials placed into the wellbore such as cement, drill shafts, liners, tubing, casing, or screens; injecting a material in a subterranean formation can include contacting with such subterranean materials. In some examples, a subterranean formation or material can be any below-ground region that can produce liquid or gaseous petroleum materials, water, or any section below-ground in fluid contact therewith.

As used in the present disclosure, the term "hydrocarbon reservoir" refers to a subterranean petroleum-producing region of a subterranean formation. Hydrocarbon reservoirs can produce liquid or gaseous petroleum materials.

As used in the present disclosure, the term "downhole" refers to under the surface of the earth, such as a location within or fluidly connected to a wellbore.

As used in the present disclosure the term "stimulation fluid" refers to fluids or slurries used downhole to stimulate hydrocarbon production, for example, in acidizing or fracturing operations.

EXAMPLES

Example 1. Colorant-Containing Tracer Compositions

Tracer Compositions 1-3 were prepared by compounding 4 g of a thermoplastic polyester elastomer including a poly(butylene terephthalate) hard segment and a polyether-based soft segment (HYTREL® 7246, DuPont™) with 0.05 g of a green pigment-containing colorant, a red pigment-containing colorant, and a yellow pigment-containing colorant (OMNICOLOR™ Multipurpose Colorants, Avient), respectively, at 240° C. using a HAAKE MiniLab 3 extruder. The tracer compositions were extruded through a thin circular die to form fibers. A comparative Composition C1 lacking a colorant was prepared by extruding 4 g of the thermoplastic polyester elastomer at 240° C.

Figure 3:
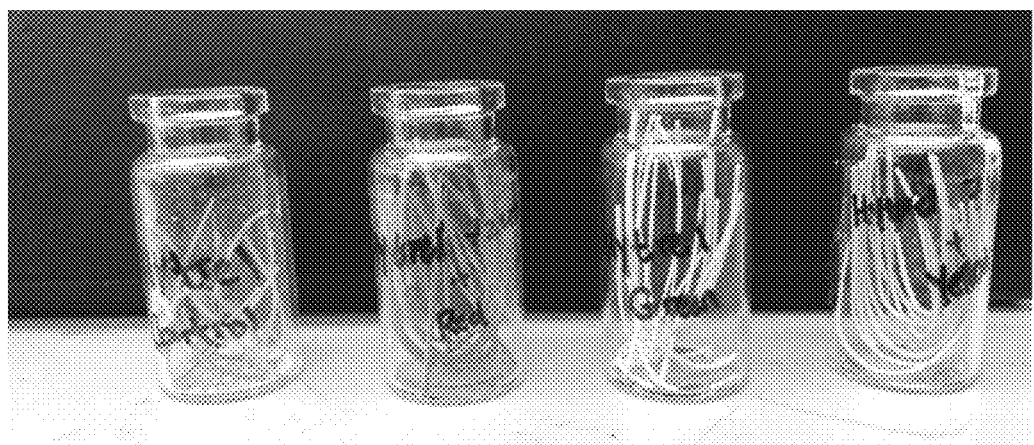
FIG. 3 is a photograph showing a comparative composition (leftmost vial) and tracer compositions (remaining vials) according to certain embodiments of the present disclosure after aging at elevated temperature and humidity, before applying pressure.
Figure 4:
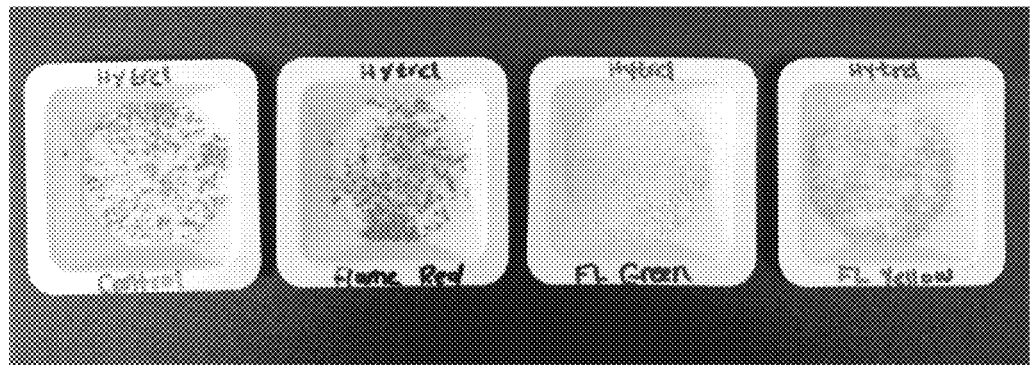
FIG. 4 is a photograph showing a comparative composition (leftmost tray) and tracer compositions (remaining trays) according to certain embodiments of the present disclosure after aging at elevated temperature and humidity, and applying pressure.

Tracer Compositions 1-3 and Composition C1 were aged under argon in a high-pressure vessel at 150° C. and about 100% relative humidity, and monitored for degradation daily. All samples started to become brittle after about 4 days, but the samples were not yet crushable under compression. After about 6 days, the samples degraded to small particles or powders upon application of pressure. The samples remained distinguishable even after degradation. FIGS. 3 and 4 show the samples after 6 days of storage under elevated temperature and humidity, before and after applying pressure, respectively.

Thermal analysis of the unextruded thermoplastic polyester elastomer, Composition C1, and Tracer Compositions 1-3 before and after aging was conducted using Differential Scanning calorimetry (DSC). Heat flow changes with temperature were compared to determine whether extrusion, with or without a colorant, affected the thermal properties of the tracer compositions. All DSC thermograms were obtained during heating and cooling at a rate of 10° C./min. The results showed a consistent melting point at ~219° C. and a recrystallization temperature at ~174° C., demonstrating some level of supercooling, for both the unextruded thermoplastic polyester elastomer and Composition C1. Similar results were observed for Tracer Compositions 1-3 before aging: a melting point at ~217° C. and a recrystallization temperature at ~180° C. The results of the DSC analysis indicate that compounding the thermoplastic polyester elastomer with a colorant via extrusion had no significant effect on the thermal behavior of Tracer Compositions 1-3 before aging. DSC scans of Tracer Compositions 1-3 after aging showed a similar melting point of ~216° C., but a slightly higher recrystallization point, at ~185° C., suggesting that the degraded particles included predominantly hard segments of the thermoplastic polyester elastomer. Glass transition events were observed for Tracer Compositions 1 and 2, demonstrating a transition from a rigid structure to a flexible structure.

Example 2. Metal Oxide- and Fluorescent Dye-Containing Tracer Compositions 1.6 g of $Al(OH)_3$ powder was mixed with 10 mL of an aqueous solution of 100 ppm of Rhodamine B, and then dried in an oven at 94° C. for 12 hours to yield a detectable component including Rhodamine B covalently bonded to the surface of particulate $Al(OH)_3$.

Tracer Composition 4 was prepared by compounding 1.6 g of the detectable component with 4 g of a thermoplastic polyester elastomer including a poly(butylene terephthalate) hard segment and a polyether-based soft segment (HYTREL® 7246, DuPont™) at 240° C. (20° C. greater than the melting point of the thermoplastic polyester elastomer) using a HAAKE MiniLab 3 extruder. The tracer composition was extruded through a thin circular die to form fibers. A comparative Composition C2 lacking the detectable component was prepared by extruding 4 g of the thermoplastic polyester elastomer at 240° C.

Tracer Composition 5 was prepared by compounding 1.6 g of the detectable component with 4 g of poly(lactic acid) (Igneo™ Biopolymer 2500HP) at 190° C. (20° C. greater than the melting point of the poly(lactic acid)) using a HAAKE MiniLab 3 extruder. The tracer composition was extruded through a thin circular die to form fibers. Comparative Composition C3 lacking the detectable component was prepared by extruding 4 g of the poly(lactic acid) at 190° C. Comparative Composition C4 lacking rhodamine B was prepared by extruding a mixture of 1.6 g of $Al(OH)_3$ powder and 4 g of poly(lactic acid) at 190° C.

Figure 5:
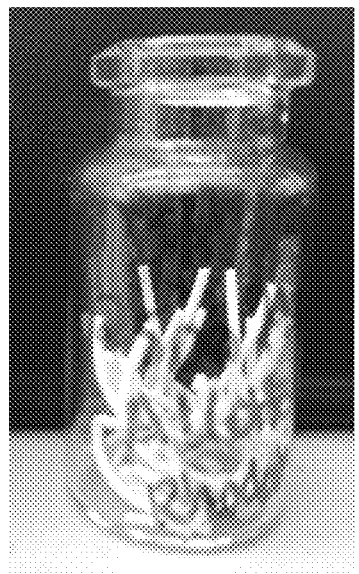
FIG. 5 is a photograph showing a tracer composition according to certain embodiments of the present disclosure after aging at elevated temperature and humidity, before applying pressure.
Figure 6:
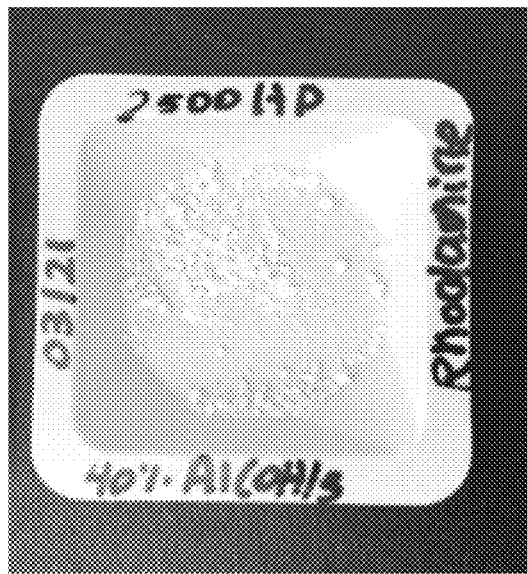
FIG. 6 is a photograph showing a tracer composition according to certain embodiments of the present disclosure after aging at elevated temperature and humidity, and applying pressure.
Figure 7:
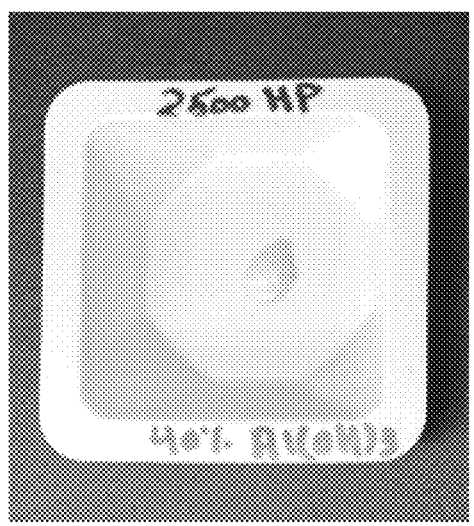
FIG. 7 is a photograph showing a comparative composition after aging at elevated temperature and humidity, before applying pressure.

Tracer Compositions 4 and 5, and Compositions C2-C4 were aged under argon in a high-pressure vessel at 150° C. and about 100% relative humidity, and monitored for degradation daily. Within about 1 day, Tracer Composition 5 and Composition C3 degraded to small particles or powders upon application of pressure. Tracer Composition 5 retained its distinguishable color even after degradation. FIGS. 5 and 6 show the sample after 1 day of storage under elevated temperature and humidity, before and after applying pressure, respectively. As shown in FIG. 7, Composition C4 did not degrade to solid particulates, and instead formed viscous, hygroscopic oligomers after aging.

Figure 8:
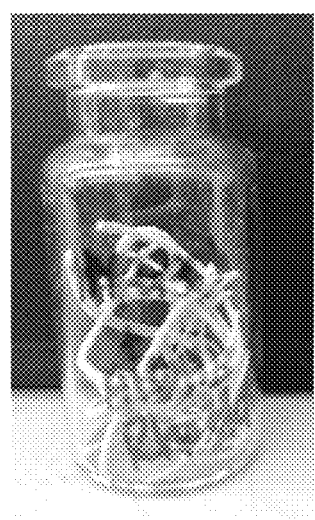
FIG. 8 is a photograph showing a tracer composition according to certain embodiments of the present disclosure after aging at elevated temperature and humidity, before applying pressure.
Figure 9:
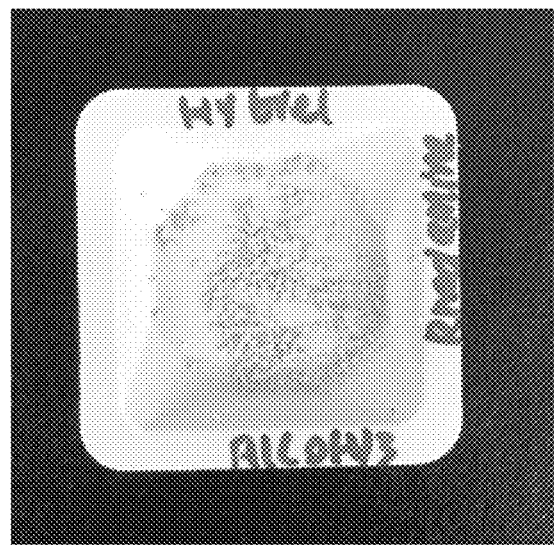
FIG. 9 is a photograph showing a tracer composition according to certain embodiments of the present disclosure after aging at elevated temperature and humidity, and applying pressure.

Tracer Composition 4 and Composition C2 started to become brittle after about 4 days, but the samples were not yet crushable under compression. After about 6 days, the Tracer degraded to small particles or powders upon application of pressure. Tracer Composition 5 retained its distinguishable color even after degradation. FIGS. 8 and 9 show the sample after 6 days of storage under elevated temperature and humidity, before and after applying pressure, respectively.

Figure 10:
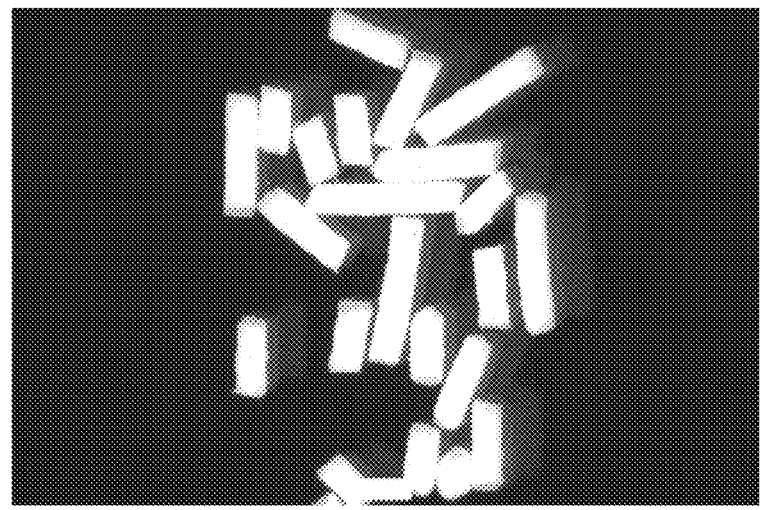
FIG. 10 is a fluorescence image of a tracer composition according to certain embodiments of the present disclosure before aging at elevated temperature and humidity.
Figure 11:
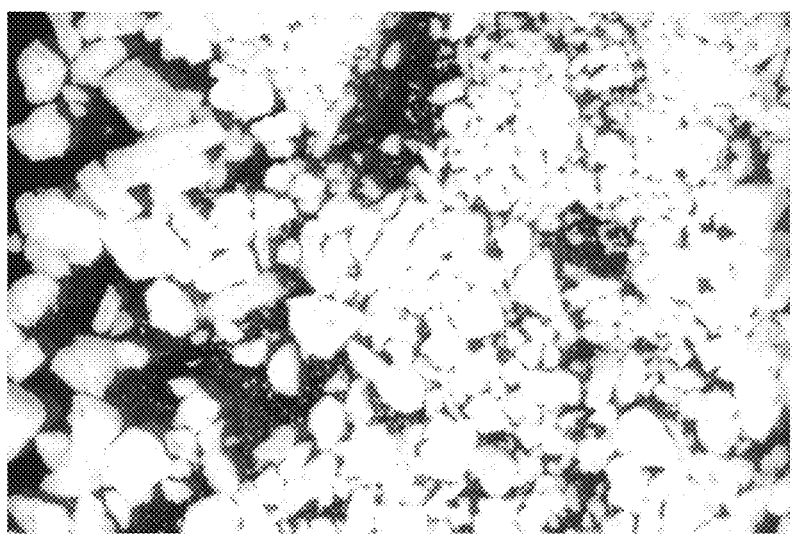
FIG. 11 is a fluorescence image of a tracer composition according to certain embodiments of the present disclosure after aging at elevated temperature and humidity, and applying pressure.
Figure 12:
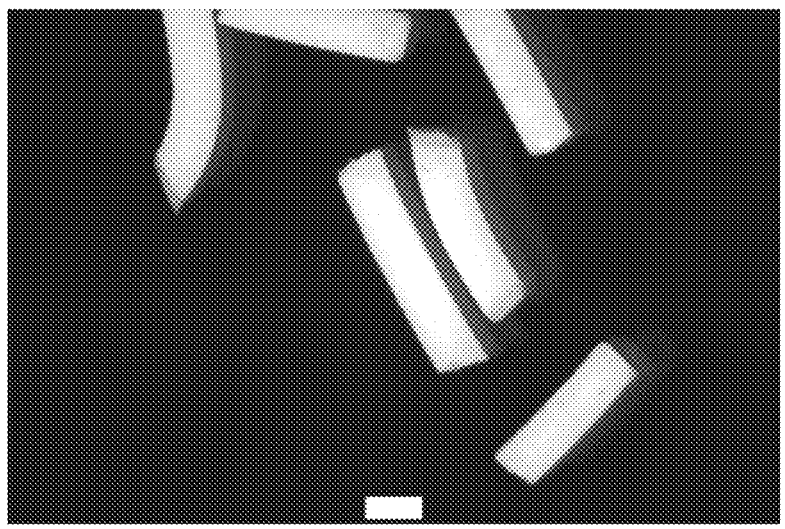
FIG. 12 is a fluorescence image of a tracer composition according to certain embodiments of the present disclosure before aging at elevated temperature and humidity.
Figure 13:
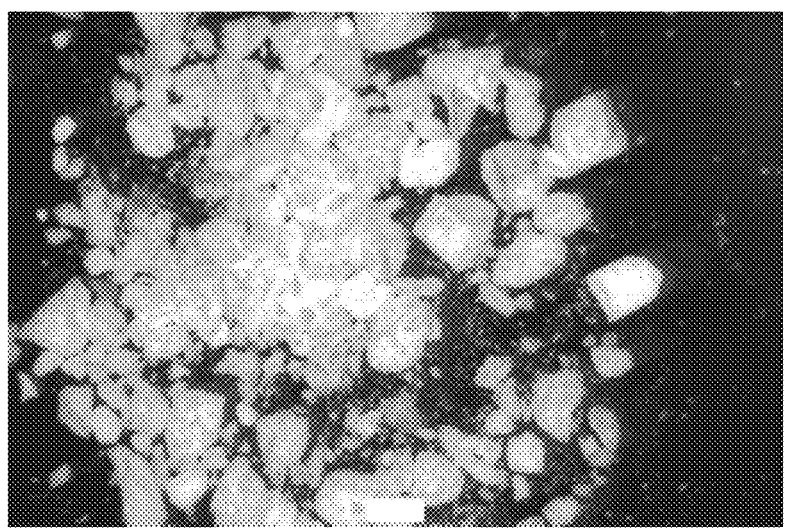
FIG. 13 is a fluorescence image of a tracer composition according to certain embodiments of the present disclosure after aging at elevated temperature and humidity, and applying pressure.

Tracer Compositions 4 and 5, before and after aging, and Composition C4 before aging, were examined under a fluorescence microscope. A Chroma ET-CY3/rhodamine filter was utilized for the measurements, with 500-ms exposures and a gain factor of 1. Fluorescence imaging showed intense and distinguishable levels of rhodamine dye for Tracer Composition 4 before and after 6 days of aging (FIGS. 10 and 11, respectively), and for Tracer Composition 5 before and after 1 day of aging (FIGS. 12 and 13, respectively). No fluorescence signal was detected for Composition C4.

Embodiments

Certain embodiments of the present disclosure are provided in the following list:

Embodiment 1. A method of tracing gas flow in a hydrocarbon reservoir, comprising:
  introducing a tracer composition at a first location in the reservoir, wherein the tracer composition comprises a degradable polymer and a detectable component;
  contacting the tracer composition with the reservoir to hydrolyze the degradable polymer; and
  detecting a degraded tracer composition in a gas sample collected at a second location in the reservoir, wherein the degraded tracer composition comprises the hydrolyzed polymer and the detectable component;
  wherein the detectable component comprises:
    a fluorescent dye; and
    a metal oxide.

Embodiment 2. The method of embodiment 1, wherein the degradable polymer comprises a thermoplastic.

Embodiment 3. The method of embodiment 2, wherein the thermoplastic comprises a poly(lactic acid).

Embodiment 4. The method of any one of embodiments 1-3, wherein the degradable polymer comprises a thermoplastic polyester elastomer.

Embodiment 5. The method of embodiment 4, wherein the thermoplastic polyester elastomer comprises a block copolymer comprising a hard segment and a soft segment.

Embodiment 6. The method of embodiment 5, wherein the hard segment comprises ethylene terephthalate, propylene terephthalate, butylene terephthalate, or any combination thereof.

Embodiment 7. The method of embodiment 5 or embodiment 6, wherein the soft segment comprises a polyether, a polyester, a polycarbonate, or any combination thereof.

Embodiment 8. The method of embodiment 7, wherein the soft segment comprises a polyether, and the polyether comprises a polyoxyalkylene glycol.

Embodiment 9. The method of any one of embodiments 1-8, wherein the fluorescent dye is detectable in the visible spectrum.

Embodiment 10. The method of embodiment 9, wherein the fluorescent dye comprises a xanthene dye.

Embodiment 11. The method of embodiment 10, wherein the xanthene dye comprises a rhodamine dye.

Embodiment 12. The method of any one of embodiments 1-11, wherein the metal oxide comprises an aluminum oxide.

Embodiment 13. The method of embodiment 12, wherein the aluminum oxide comprises aluminum hydroxide.

Embodiment 14. The method of any one of embodiments 1-13, wherein the tracer composition comprises an extrudate of the degradable polymer and the detectable component.

Embodiment 15. The method of any one of embodiments 1-14, wherein the tracer composition comprises particles having an average size of at least about 5 mm.

Embodiment 16. The method of embodiment 15, wherein the particles of the tracer composition comprise pellets or fibers.

Embodiment 17. The method of embodiment 16, wherein the particles comprise fibers having an average length of at least about 4 mm.

Embodiment 18. The method of any one of embodiments 15-17, wherein the degraded tracer composition comprises particles having an average size of less than about 2 mm.

Embodiment 19. The method of embodiment 18, wherein the particles of the degraded tracer composition comprise a powder.

Embodiment 20. The method of any one of embodiments 1-19, wherein introducing the tracer composition comprises pumping a stimulation fluid comprising the tracer composition into the reservoir at the first location.

Embodiment 21. The method of embodiment 20, wherein the stimulation fluid comprises an acid.

Embodiment 22. The method of any one of embodiments 1-21, wherein the second location comprises a gas pipeline.

Embodiment 23. The method of any one of embodiments 1-22, wherein detecting the degraded tracer composition comprises capturing the degraded tracer composition on a filter.

Embodiment 24. The method of any one of embodiments 1-23, wherein detecting the degraded tracer composition comprises detecting the fluorescent dye with a fluorometer.

Embodiment 25. The method of any one of embodiments 1-24, wherein detecting the degraded tracer composition comprises detecting the metal oxide with an X-ray fluorescence spectrometer.

Embodiment 26. A stimulation fluid comprising an aqueous medium and a tracer composition, wherein
the tracer composition is suspended in the aqueous medium; and
the tracer composition comprises a degradable polymer and a detectable component, wherein the detectable component comprises:
a fluorescent dye; and
a metal oxide.

Embodiment 27. The stimulation fluid of embodiment 26, further comprising an acid.

Embodiment 28. The stimulation fluid of embodiment 27, wherein the acid comprises hydrofluoric acid, hydrochloric acid, or both.

Embodiment 29. The stimulation fluid of any one of embodiments 26-28, wherein the aqueous medium comprises produced water.

Other implementations are also within the scope of the following claims.

What is claimed is:

1. A method of tracing gas flow in a hydrocarbon reservoir, comprising:
   introducing a tracer composition at a first location in the reservoir, wherein the tracer composition comprises a degradable polymer and a detectable component;
   contacting the tracer composition with the reservoir to hydrolyze the degradable polymer; and
   detecting a degraded tracer composition in a gas sample collected at a second location in the reservoir, wherein the degraded tracer composition comprises the hydrolyzed polymer and the detectable component;
   wherein the detectable component comprises:
   a fluorescent dye; and
   a metal oxide.

2. The method of claim 1, wherein the degradable polymer comprises a thermoplastic.

3. The method of claim 2, wherein the thermoplastic comprises a poly(lactic acid).

4. The method of claim 1, wherein the degradable polymer comprises a thermoplastic polyester elastomer.

5. The method of claim 4, wherein the thermoplastic polyester elastomer comprises a block copolymer comprising a hard segment and a soft segment.

6. The method of claim 5, wherein the hard segment comprises ethylene terephthalate, propylene terephthalate, butylene terephthalate, or any combination thereof.

7. The method of claim 5, wherein the soft segment comprises a polyether, a polyester, a polycarbonate, or any combination thereof.

8. The method of claim 7, wherein the soft segment comprises a polyether, and the polyether comprises a polyoxyalkylene glycol.

9. The method of claim 1, wherein the fluorescent dye is detectable in the visible spectrum.

10. The method of claim 9, wherein the fluorescent dye comprises a xanthene dye.

11. The method of claim 10, wherein the xanthene dye comprises a rhodamine dye.

12. The method of claim 1, wherein the metal oxide comprises an aluminum oxide.

13. The method of claim 12, wherein the aluminum oxide comprises aluminum hydroxide.

14. The method of claim 1, wherein the tracer composition comprises an extrudate of the degradable polymer and the detectable component.

15. The method of claim 1, wherein the tracer composition comprises particles having an average size of at least about 5 mm.

16. The method of claim 15, wherein the particles of the tracer composition comprise pellets or fibers.

17. The method of claim 16, wherein the particles comprise fibers having an average length of at least about 4 mm.

18. The method of claim 15, wherein the degraded tracer composition comprises particles having an average size of less than about 2 mm.

19. The method of claim 18, wherein the particles of the degraded tracer composition comprise a powder.

20. The method of claim 1, wherein introducing the tracer composition comprises pumping a stimulation fluid comprising the tracer composition into the reservoir at the first location.

21. The method of claim 20, wherein the stimulation fluid comprises an acid.

22. The method of claim 1, wherein the second location comprises a gas pipeline.

23. The method of claim 1, wherein detecting the degraded tracer composition comprises capturing the degraded tracer composition on a filter.

24. The method of claim 1, wherein detecting the degraded tracer composition comprises detecting the fluorescent dye with a fluorometer.

25. The method of claim 1, wherein detecting the degraded tracer composition comprises detecting the metal oxide with an X-ray fluorescence spectrometer.

* * * * *